United States Patent Office

3,723,272
Patented Mar. 27, 1973

3,723,272
PREPARATION OF OCTACHLOROCYCLO-
PENTENE USING ULTRAVIOLET LIGHT
Stephen Robota, North Tonawanda, N.Y., assignor to Hooker Chemical Corporation, Niagara Falls, N.Y.
No Drawing. Filed Oct. 26, 1971, Ser. No. 192,628
Int. Cl. B01j 1/10
U.S. Cl. 204—163 R    4 Claims

ABSTRACT OF THE DISCLOSURE

Octachlorocyclopentene is prepared from dicyclopentadiene by a simple and direct, two-stage, chlorination process. The first stage provides for depolymerizing the dicyclopentadiene dimer by thermocracking, and thereafter chlorinating with an excess of chlorine under a heel of chlorinated cyclopentadiene to form polychlorocyclopentanes containing between 4 and 5 chlorine atoms. The second stage provides for the further chlorination of the polychlorocyclopentanes to octachlorocyclopentenes at constant temperature and with an excess of chlorine. Provision is made therein for the chlorination in both stages by both non-catalytic and catalytic methods.

---

The present invention relates to the preparation of octachlorocyclopentene by a simple and direct two-stage process of chlorinating dicyclopentadiene.

Octachlorocyclopentene is a valuable organic compound which is useful because it liberates free chlorine at elevated temperatures with the accompanying formation of diolefinic structure, which property is desirable in connection with the purification of molten metals wherein the chlorine is a primary purification agent. The reactive double bonds also aid in such purification. The compound is also useful as a chemical intermediate in various industries including the dye-stuffs, plastics and insecticide industries, and is particularly suitable as a raw material for producing hexachlorocyclopentadiene by the known process, which gives substantially quantitative yields of hexachlorocyclopentadiene, by pyrolyzing octachlorocyclopentene at temperatures of between 275° centigrade and 550° centigrade, preferably from between 425° centigrade to 525° centigrade, in the absence of a catalyst.

Various methods have been proposed for the preparation of octachlorocyclopentene. Despite the fact that a number of processes can be utilized for the preparation of octachlorocyclopentene, there has been no wholly satisfactory method for preparing this chloro-carbon on a commercial scale. The chlorination procedures which have in the past been employed for this purpose can be classified by the following methods.

One method for preparing octachlorocyclopentene, disclosed as an intermediate in the production of hexachlorocyclopentadiene, was devised by Prinz. The process is a complex multi-stage synthesis which would appear, on the basis of the chemical literature, poorly adaptable to warrant commercial exploitation.

A second method for the preparation of octachlorocyclopentene is disclosed in the article "The Chemistry of Perchlorocyclopentene and Cyclopentadienes" by H. E. Lingnade and E. T. McBee, Chemical Review Volume 58, No. 2, April 1958. Therein, the primary emphasis is to the production of hexachlorocyclopentadiene, from pentane, isopentane, cyclopentane and other 5 carbon hydrocarbons, by a two-stage process which includes photochemical chlorination in the liquid phase, at 80°–90° C., until the pentanes have an average composition of approximately $C_5H_5Cl_9$ and density of 1.63–1.70. These resulting polychloropentanes are then vaporized and passed together with an excess of chlorine over a porous, surface-active solid, such as fuller's earth, maintained at 300°–400° C. and through an unpacked section of tube held at 450–525° C. Depending upon the conditions of the thermal chlorination step and the final temperature, a small amount of octachlorocyclopentene may be also produced and isolated. This process has disadvantages in that it produces a large variety of other chloro-carbon by-products and necessitates the use of apparatus capable of handling large amounts of gaseous chlorine at extremely high temperatures. U.S. Pat. 2,714,124, issued July 1955 provides further disclosure of this method of preparing octachlorocyclopentene from polychloropentanes, having an average chlorine content of more than two atoms per molecule, by reacting the polychloropentane with chlorine in a reaction zone containing a porous, surface-active catalyst maintained at a temperature between about 280 degrees centigrade to 550 degrees centigrade.

A third method for the production of octachlorocyclopentene, utilizing cyclopentadiene as a starting material, is disclosed in U.S. Pat. 2,900,420, issued Aug. 18, 1959. Therein, cyclopentadiene is disclosed as being chlorinated at temperatures between −50° and 80° C. to produce tetrachlorocyclopentane; and thereafter the thus obtained tetrachlorocyclopentane is further chlorinated at controlled temperatures between 170° to 295° to produce octachlorocyclopentene. The process is disclosed as an intermediate by-product in the production of hexachlorocyclopentadiene and utilizes a pressurized system or catalysts such as phosphorus pentachloride and arsenic oxide, to promote the reaction. A problem associated with this method is that the chlorination from the tetrachlorocyclopentane to octachlorocyclopentene is progressive and necessitates the constant increase of temperatures as the boiling point of the reaction mixture rises under conditions which insure constant saturation of the reaction mixture with free chlorine. These factors contribute to the commercial expense and complexity of the process and represent disadvantages which applicant has remedied.

An object of the present invention is to provide a process for the production of octachlorocyclopentene in high yield by a direct and simple procedure. Another object is to provide such process which involves relatively simple reactions, produce high yield, and do not produce an objectionable variety of chlorocarbon by-product. It is a further object to provide a method for the production of octachlorocyclopentene from inexpensive, commercially available raw materials. Another object of the present invention is to provide a method whereby octachlorocyclopentene is economically produced from dicyclopentadiene. Another object is to provide a commercial process under conditions readily obtainable in commercial practice. These and other objects will become apparent from the following to those skilled in the art.

We have now found that we are able to accomplish the objects above stated and are able to obtain octachlorocyclopentene, usually in high yield, by a continuous two-stage process of chlorinating low cost, commercially available dicyclopentadiene. In the first stage, the starting dicyclopentadiene dimer raw material is depolymerized to cyclopentadiene by thermocracking at temperatures from about 170° C. to about 500° C. and the pure cyclopentadiene product thereafter reacted with an excess of chlorine, under a heel of polychlorocyclopentane, so as to form polychlorocyclopentanes containing between 4 to 5 chlorine atoms, i.e., $C_5H_6Cl_4$ to $C_5H_5Cl_5$. The reaction with excess chlorine can be carried out catalytically or non-catalytically, at a temperature of from about 20° C. to about 180° C. or preferably from about 60° C. to about 120° C. A preferred catalyst in the above described reaction is ultra-violet light. The first stage polychlorocyclopentane reaction products, containing between 4 to 5 chlorine atoms, are then subjected to further chlorination in a second stage at a constant temperature of about 160°–165° C., with an excess of chlorine. This reaction may also be carried out catalytically or non-catalytically. A preferred catalyst is reaction in the presence of ultra violet light. Because of the instability of octachlorocyclopentane we expect ultra-violet radiation to cause dechlorination thereof, and subsequent low yields, however we find the opposite to be true. The resultant product is high yield, substantially pure, octachlorocyclopentene. We have found that products obtained in this manner contain more than 93% octachlorocyclopentene and can be prepared in quantitative yields.

The actual means, which may be utilized to carry out the process of this invention, can be understood more easily by consideration of actual examples which show how the desired results of each of the steps of the process have been achieved. Toward this end, examples which illustrate the steps of the process are given hereinafter. It should, of course, be understood that these examples are illustrative only and are no-wise to be taken as limiting the scope of our invention.

EXAMPLE 1

First stage.—Photochemical chlorination: Dicyclopentadiene (approximately 93% pure) was continuously fed through a flow meter into a vertical 26" x 1" glass tube at a rate of 7.68 grams per minute. The tube was heated externally by Nichrome wires and served primarily as a vaporizer for the dicyclopentadiene feed. At the bottom of the vaporizer tube was a heated glass flask serving as a reboiler and a residue receiver. Dicyclopentadiene vapors were collected from the top of the glass tube and thereafter passed through a 40" x 1" nickel "cracker" tube which was heated by three electric ovens. A thermocouple was inserted inside the tube to measure internal temperatures. The last section of the cracker tube was maintained at an average temperature of 484 degrees centigrade. In this cracker tube, complete depolymerization of dicyclopentadiene to cyclopentadiene was accomplished, with a very small amount of residue being collected in the reboiler and residue receiver. Cyclopentadiene vapors were collected from the top of the "cracker" tube and fed into a 36" x 1" packed fractionating column. At the bottom of this column was a small heated flask serving as a reboiler and a catchall for high boilers. The fractionating column was operated at a reflux ratio of 3 to 7, and an overhead column temperature at the boiling point of cyclopentadiene (40–41° C.). Pure liquid cyclopentadiene was fed from the column through a water-cooled condenser into a cold finger prior to being discharged into a 3-liter reaction flask. The cyclopentadiene was forced out of the feed pipe by a small nitrogen gas purge to minimize reaction in this pipe. The 3-liter reaction flask contained a heel of previously prepared polychlorocyclopentane (1085 grams of tetrachlorocyclopentane, specific gravity 1.55 g. at 25 degrees centigrade). A metered amount (29.2 grams per minute) of chlorine gas was introduced into the polychlorocyclopentane heel so as to react with the cyclopentadiene. The temperature in the flask was maintained at 106 degrees centigrade by partial immersion in a water bath, and photochlorination was caused by an adjacent 250 watt ultra-violet lamp. The reaction mixture was agitated and its temperature was measured by means of an inserted thermometer. The reactor vent gases were passed through a water-cooled condenser and then into a caustic scrubber. A total of 1,130 grams of dicyclopentadiene starting material was utilized in the reaction run. When the run was stopped, there was 3,015.8 grams of product (original heel excluded) in the 3-liter glass flask having a specific gravity of 1.5400 at 25 degrees centigrade. The product analyzed was found to contain 70.5 percent chlorine, which corresponded to polychlorocyclopentanes having an empirical formula of $C_5H_{5.6}Cl_{4.4}$.

Second stage: The products from the first stage chlorination process were transferred to a 5-liter agitated glass flask provided with an inserted thermometer, a heating mantle and a vertical water-cooled glass condenser through which exit gases passed into a caustic scrubber. The charge to the reactor was 3,158 grams. Chlorine was metered into the liquid charge by a feed pipe to a total of 3,907 grams. Chlorination was carried out catalytically at a temperature of 160 degrees centigrade using an adjacent 250 watt ultraviolet light. At the end of a 10.2 hour time period, the organic had a specific gravity of 1.6591 at 25 degrees centigrade and analyzed at 76.2 percent chlorine, thus corresponding to an empirical formula of $C_5H_{4.2}Cl_{5.8}$. Photochlorination was continued using 1,940.5 grams of the product just made, and was continued for 28.33 hours at 164 degrees centigrade. The chlorine feed rate was 4.0 grams per minute. 2,329.9 grams of final product was obtained which had a specific gravity of 1.822 at 38 degrees centigrade, and a chlorine content of 82.5 percent. Infrared analysis determined the product to contain 89 percent octachlorocyclopentene and no hexachlorocyclopentadiene.

EXAMPLE 2

Non-catalytic chlorination

First stage: 1220 grams of dichlorocyclopentadiene (approximately 93% pure) was continuously fed into the apparatus of Example 1, stage 1, at a rate of 8.32 g./min. The last section of the "cracker" tube was maintained at 483° C. First stage chlorination was maintained at an average temperature of 65° C., under a 700 ml. feed of previously prepared tetrachlorocyclopentane, and chlorine was introduced at a rate of 30.5 g./min. until a total 4484 grams of chlorine was charged. The reaction was run for 6.25 hours and produced 3240 grams of a product having a sp. gravity of 15571 at 25° C. and analyzing 71.9% chlorine. This corresponds to an empirical formula of $C_5H_{5.4}Cl_{4.6}$.

Second stage: 5169 grams of combined products from the above and other first stage runs using the same method and conditions for chlorinating were charged into a 5 litre glass flask. This reactor was covered to eliminate any photochemical effects of light. 6436 grams of chlorine was metered into the flask over 26.25 hours and the temperature was maintained at 163° C. The specific gravity of the reaction mixture at the end of this period was 1.660 at 25° C. This product was thereafter combined with other products from runs utilizing the identical reactor procedure and conditions and the composite sample had a specific gravity of 1.663 at 25° C. and analyzed 75.80% chlorine by infrared analysis. Chlorination at 160–165° C. was continued for 32 hours wherein the final product was found to have a specific gravity of 1.825 at 38° C. and contained 93% octachlorocyclopentane and no hexachlorocyclopentadiene when analyzed by infrared analysis.

The invention has been described herein with reference to certain specific embodiments thereof; however, it is to be understood that such description has been given by way of illustration and example and not by way of limitation. Reference for the latter purpose being limited to the appended claims.

What is claimed is:

1. A two-stage process comprising (1) thermocracking, at a temperature from about 275° C. to about 550° C., dicyclopentadiene dimer to form cyclopentadiene, chlorinating said cyclopentadiene in an excess of chlorine, in the presence of ultra-violet light and under a heel of polychlorocyclopentane to form polychlorocyclopentenes containing from 4–5 chlorine atoms, and (2) chlorinating said polychlorocyclopentene in the presence of ultra-violet light at a temperature from about 160° C., to about 165° C., with an excess of chlorine, to octachlorocyclopentene.

2. A two stage process for the preparation of octachlorocyclopentene comprising (1) thermocracking dicyclopentadiene dimer and thereafter chlorinating the product in an excess of chlorine, under a heel of chlorinated cyclopentadiene to form a polychlorocyclopentane product containing from 4–5 chlorine atoms and (2) chlorinating the said polychlorocyclopentane product, at constant temperature, in the presence of ultra violet light with an excess of chlorine to octachlorocyclopentene.

3. The process of claim 2 wherein said chlorinating in stage (1) is in the presence of ultraviolet light.

4. The process of claim 2 wherein said thermocracking is conducted at a temperature from about 275° C. to about 550° C.

References Cited

UNITED STATES PATENTS

| | | | |
|---|---|---|---|
| 2,473,162 | 6/1949 | McBee et al. | 204—163 R |
| 2,509,160 | 5/1950 | McBee et al. | 204—163 R |
| 3,073,869 | 1/1963 | Hanna et al. | 260—648 C |
| 3,506,726 | 4/1970 | Hanna | 204—163 R |
| 3,637,479 | 1/1972 | Rosenberg et al. | 204—163 R |

BENJAMIN R. PADGETT, Primary Examiner

U.S. Cl. X.R.

260—648 C